INVENTORS
Kenneth B. Scow
Joseph P. Anderson
Bruce I. Bertelsen

United States Patent Office 3,492,158
Patented Jan. 27, 1970

3,492,158
THIN FILMS WITH INHERENT NDRO PROPERTIES AND THEIR PRODUCTION
Kenneth B. Scow, Wappingers Falls, and Joseph P. Anderson, Hyde Park, N.Y., and Bruce I. Bertelsen, Essex Junction, Vt., assignors to International Business Machines Corporation, Armonk, N.Y., a corporation of New York
Filed Dec. 30, 1965, Ser. No. 527,409
Int. Cl. C23c *13/02;* G03g *19/00*
U.S. Cl. 117—236        8 Claims

ABSTRACT OF THE DISCLOSURE

A thin magnetic film having NDRO properties is prepared by depositing a film at a temperature between 300° and 254° C. in a non-oxygenous atmosphere in an applied magnetic field and maintaining the temperature at about 300° C. or higher while exposing the resulting film to an oxygen-containing atmosphere.

---

Figure 1:
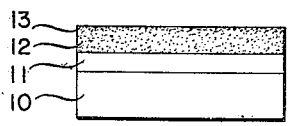

The present invention relates to thin magnetic, principally nickel-iron, films which are formed by the deposition of magnetic metals and which exhibit unique magnetic characteristics. More particularly it relates to a novel thin magnetic film having inherent non-destructive-readout properties, commonly known as NDRO properties and the method by which they are produced.

Recently much scientific research and inquiry have been directed toward discovering the role of oxygen and oxides in the formation of thin magnetic films. To give only a few examples, all the following publications of the recent past, have dealt at length with NDRO films and oxygen in films:

(1) Goto et al., "Magnetization and Switching Characteristics of Composite Thin Magnetic Film." Presented at Intermag Conference, Apr. 22, 1965.

(2) Crowther, T. S., "The Effect of Cu Diffusion on the Magnetic Properties of Thin Films." Presented at the Intermag Conference, Apr. 21, 1965.

(3) Hart, I. W., "A Non-destructive Thin Film Memory." Solid State Design, Part I, pages 25–30, December 1963; Part II, pages 28–34, January 1964.

(4) Gran et al., U.S. Patent No. 3,102,048.

In the course of our work on thin magnetic films, we have made the surprising discovery that films formed at elevated temperatures in a non-oxygenous atmosphere upon exposure to oxygen or an oxygenous atmosphere while still at elevated temperatures, preferably substantially immediately after the formation of the film, develop very stable non-destructive-read-out properties and other exceptional qualities discussed in greater detail below.

The chief object of the present invention, therefore, is to describe a method of producing novel thin magnetic films having inherent non-destructive-read-out (NDRO) properties and other advantages developed as a part of a deposition process. For this purpose the invention provides a process for the deposition of thin films, especially those about 1000 A., or lower, of suitable materials by modifications of basically known methods such as vacuum vaporization. Most advantageously, immediately or substantially immediately after the deposition of the films, at high temperatures, they are exposed to an oxygen-containing atmosphere. Films formed in this manner possess NDRO properties of remarkably superior quality and stability. No theory that fully accounts for the properties found in these films has yet been discovered. However, initial data gathered as a result of test evaluations performed on these films at both low and high frequencies indicate that the films formed in accordance with the present invention possess markedly excellent rotational writing speeds and that high word drives do not disturb the written information thereon. Actually the same word drives can be used in write and read operations.

The temperature at which the films of this invention are deposited and at which they are first exposed to oxygen or to a fixed partial pressure of dry air is a critical factor in the practice of this invention. In other words, a temperature has been found below which the NDRO properties desired are not produced in the freshly prepared films on exposure to the fixed partial pressure of dry air. In general, the oxygenous atmosphere must be introduced while the temperature of the substrate and the film thereon is above 300° C. Furthermore, our investigation shows that the NDRO films formed by the present invention neither split nor lock with the hard direction field (H⊥) of the cross field loop. On the contrary, they retain their initial easy direction remanence, regardless of hard drive amplitude or the number of hard drive field applications. There is evidence of a hard direction bias left in the films of this invention after each H field reversal but this bias does not significantly adversely affect the retention of the initial, or inherent, easy direction remanence.

Two evaluations of the films of this invention are worth noting. One, no domain wall structure could be observed, by the Bitter technique, in the films of this invention after a hard direction drive field application. Secondly, on visual observation by Kerr effect of a region of reverse magnetization in a continuous NDRO film created by pulse fields, it was seen that the region of reversal retained its shape perfectly after application of many reversals of high amplitude hard direction fields.

The foregoing observations seem to indicate that a two layer film consisting of a bottom layer of law dispersion anisotropic material and a top layer of isotropic material, or very high dispersion material, have been formed and are in intimate contact allowing exchange coupling of the two layers. A biaxial exchange coupled top film model may also explain these observations. The exchange coupling of two anisotropic films of unequal anisotropy amplitude has been discussed by Goto et al, referred to above. However, their theory does not explain the hard direction bias noted in the oxygen exposed samples of this invention.

The observation of an apparent hard direction bias residual in the film after a read (H⊥) drive leads to the belief that formation of a cross tie or Bloch domain walls is inhibited or prevented entirely in the films formed in accordance with the present invention. This belief, if verified by the work in progress now, would exclude a wall motion mechanism such as proposed by Hart, cited above.

According to some recent theories "creep" is absent if these wall types are absent and that the formation of the latter may be prevented by a hard direction bias. Recent laboratory experiments tend to confirm this theory. Thus, it seems probable that the use of the presently disclosed type of films will obviate the former practice of creating discreet storage regions for the sole purpose of preventing interaction of storage regions by the "creep" process. Also, it should be possible to increase bit density in a storage plane since the most sensitive mechanism of deleterious interaction is that of "creep." The magnetic films of the present invention, therefore, possess unique benefits in the present day NDRO memory systems. That these films return fully to the storage condition regardless of read drive (H⊥) amplitude or duration is a valuable improvement over other NDRO device systems.

Gran et al., noted above, show a process for imparting magnetically rotatable anisotropy to relatively thick so-called "thin" nickel-iron films (having thickness greater than 2780 A.) by subjecting the substrate on which they are formed prior to their deposition to an exposure to air. No improvements in NDRO are attributed to the subsequently deposited films. Films made by us on air exposed substrates showed no unusual NDRO characteristics at the 1000 A. thickness level.

Chain store NDRO devices of the prior art customarily disadvantageously require two different pulse amplitudes for reading and writing. On the other hand, two layer NDRO devices require tight control over the read field amplitude and the write field pulse timing or amplitude while eddy current return devices are sensitive to word pulse duration. In contrast thereto, the present films in an NDRO memory can use the same word driver for both read and write operations. Moreover, in the films hereof signal amplitude need not be sacrified during read operations, nor is it necessary to lose energy in generating eddy currents.

The foregoing and other objects, features and advantages of the invention will be apparent from the following more particular description of a preferred embodiment thereof, as illustrated in the accompanying drawings:

In the drawings:

FIGURE 1 is a schematic greatly enlarged representation showing the potential several layers of the thin magnetic film of the invention deposited on a substrate.

Figure 2A:
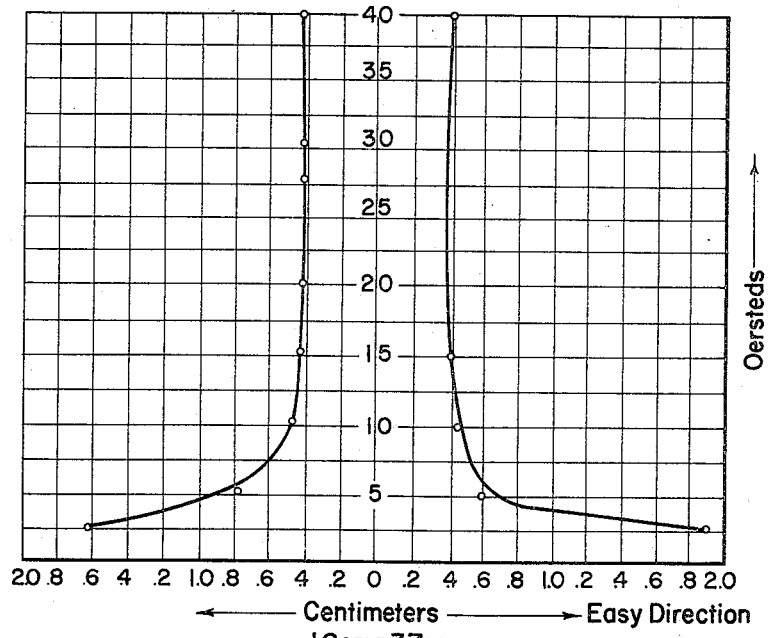
Figure 2B:
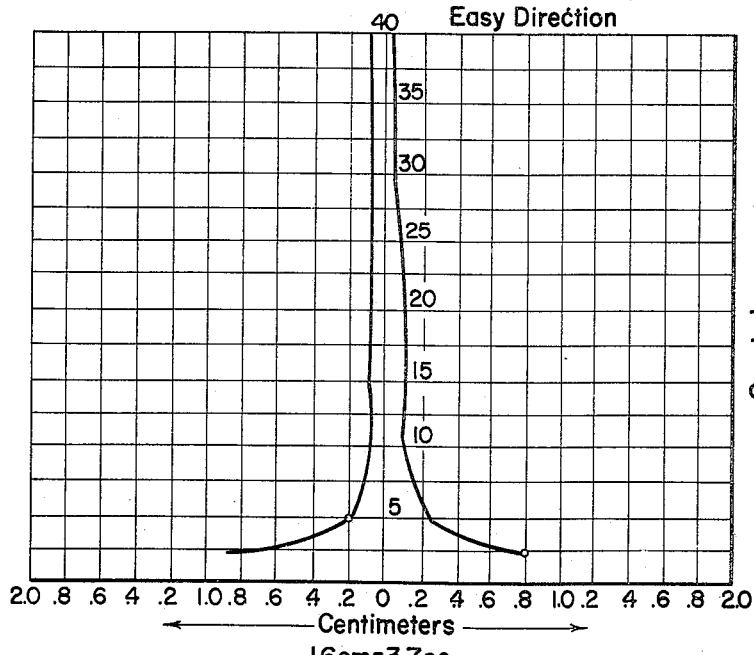

FIGURES 2A–2B graphically show critical switching curve of films of the present invention at relatively high and low operable temperatures of the substrate respectively during film exposure to a gas atmosphere at a fixed partial pressure of air.

Referring to FIGURE 1, the numeral 10 refers to a substrate or a base plate which may be glass or a non-magnetic metal or other suitable non-magnetic material which is capable of being cleaned adequately to produce a suitable smooth and flawless surface for deposition. We have found that best results are obtained when the substrate is of a silver-copper alloy. In accordance with techniques well known in the art, substrate 10 is cleaned with ultrasonic agitation in a suitable solution of an alcohol and acetone. It is then baked for about an hour at temperatures above 300° C., perferably at 350° C., in vacuum so as to thoroughly outgas the substrate. The temperature of the substrate is then raised to 400° C. and stabilized there for an hour. Next, a surface of the substrate is passivated, such as by depositing a layer of silicon monoxide thereon, identified here as 11, at a rate of about 30 A. per second for about ten minutes at about $1 \times 10^{-6}$ torr vacuum pressure. Again, the temperature of the substrate is stabilized at a selected value above 300° C., preferably between 300° C. and 425° C. for about 30 minutes after which a deposition at, e.g., a temperature between 305° and 425° C. of NiFe alloy, commonly known as Permalloy, is made in a conventional vacuum chamber, while the substrate is under a magnetic field of about 30 oersteds. The composition of the NiFe melt from which the film is derived is not critical as long as the deposited Permalloy film shown here as 12 is of the desired composition, in this instance nickel about 81%, balance iron. Typically, however, the composition of the melt is richer in nickel by about 0.5% than the composition of the deposited film because of the slight difference in the vapor pressures of nickel and iron.

In the embodiment illustrated, the Permalloy film was deposited at a rate of about 10 A. per second until the desired thickness of the deposition of about 900 A. was obtained. In the preferred embodiment the deposition is carried on for about 80 seconds at a vacuum pressure of approximately $1.5 \times 10^{-6}$ torr. Now, in accordance with the teachings of the prior art, after the desired thickness of the Permalloy film is obtained, it is cooled down while maintaining a magnetic field of suitable strength to about 100° C. after which it is taken out of the vacuum chamber and exposed to ambient atmosphere. But in accordance with this invention, immediately after the deposition of the magnetic materials while the film is still at elevated temperatures and subject to a suitable magnetic field, it is further treated by exposure to an oxygen-containing atmosphere. In the preferred embodiment, this is done by opening a leak valve connected to the vacuum chamber and to dry air supply system immediately after the Permalloy deposition is terminated and while the film is still at elevated temperatures above 300° C. and is subject to a magnetic field of about 32.5 oersteds resulting in the oxidation of the Permalloy film throughout its grain boundaries as well as along its surface shown here as 13. Typically, films of this invention are produced by bleeding dry air into the vacuum chamber until the pressure therein is between $2.5 \times 10^{-5}$ torr and $8 \times 10^{-5}$ torr. Thus, it will be seen that in carrying out the present invention, it is extremely important that the freshly deposited magnetic films are exposed to an oxygen-containing atmosphere while the temperatures are still above 300° C. and, preferably immediately, or substantially immediately, after the deposition of the magnetic materials is completed. If the newly formed films are allowed to cool down below 300° C. and then exposed to oxygen, they will not exhibit NDRO properties described above. Also, the reheating of the films to above 300° C. once they have been cooled down below this temperature and their subsequent exposure to oxygen or dry air will not impart NDRO properties to the films.

Both the substrate temperature at the start of the oxygenous gas flow and the pressure thereof during the exposure effect the quality of the deposited films although the "freshness" of the film and the avoidance of temperatures below about 300° C. appear to be the major factors in obtaining the desired properties.

One measurement of the magnetic quality is the openness of the critical switching curve in the hard direction. As shown in FIGURE 2A and FIGURE 2B, the critical curves for films of the present invention have been plotted at various temperatures of the deposited magnetic film. For films deposited at $1.5 \times 10^{-6}$ torr and exposed to dry air at 385° C. and at vacuum pressure $2 \times 10^{-5}$ torr for about an hour, the critical curve shows considerable opening. See FIGURE 2A. The wall motion threshold (Ho) in the easy direction is approximately 8.0 oersteds. Films exposed at relatively low temperatures, 325° C., pressure and time of exposure being the same, exhibit lower magnetic threshold, but the critical curve is still open in the hard direction. See FIGURE 2B. However, the wall motion threshold in the easy direction is reduced to 6.2 oersteds. It may be noted here that further reduction of the film temperatures to 300° C. and below and their subsequent exposure to gas produces ordinary low dispersion uniaxial films. By this, and similar evaluative techniques, the most desirable partial pressures for the oxygenous atmosphere and the most desirable oxygenating temperature may be determined empirically and thereafter used.

In the illustrative preferred embodiment, film 12 has a composition of 81% nickel, balance iron. Alloys or mixtures giving melts appropriate to the production of such films are well known. For instance, other films of Permalloy containing 77%–83% nickel, balance iron can be produced in a like manner. Similarly, cobalt-containing Permalloy films can be produced from appropriate melts in the manner set out above by adding about 3% cobalt to such alloys.

While the invention has been particularly shown and described with reference to a preferred embodiment thereof, it will be understood by those skilled in the art that various changes in form and details may be made therein without departing from the spirit and scope of the invention.

What is claimed is:

1. In a method of forming a thin magnetic, principally nickel-iron, film which comprises:

(a) thoroughly cleaning a non-magnetic substrate;

(b) baking the substrate in vacuum at temperatures above 300° C. so as to outgas the substrate thoroughly;

(c) depositing in vacuum a passivating layer of silicon monoxide of desired thickness on a surface of said substrate at temperatures above 300° C.;

(d) depositing in a vacuum chamber by vacuum vaporization a layer of the magnetic nickel-iron material of desired thickness not substantially exceeding 1000 A. on the passivated surface of said substrate at temperatures between 305° and 425° C. and at a pressure of about $1.5 \times 10^{-6}$ torr and in a magnetic field of about 30 oersted;

the improvement comprising exposing the resulting magnetic nickel-iron layer to an oxygen-containing atmosphere by introducing dry air into the vacuum chamber for a period substantially immediately after the deposition of said magnetic layer while said magnetic layer is still at a temperature above 300° C. and before the final annealing thereof, the oxygen-containing atmosphere having sufficient oxygen to impart at the exposure temperature and in the exposure period inherent non-destructive-read-out properties to the film.

2. A method according to claim 1 wherein the magnetic film is subjected to an applied magnetic field during exposure to the oxygen-containing atmosphere.

3. In combination, a substrate bearing a thin magnetic permalloy film prepared according to the method of claim 1 and wherein the permalloy is oxidized throughout its grain boundaries as well as along its surface.

4. In a method for forming a thin magnetic, principally nickel-iron, film comprising vacuum depositing the nickel-iron on a substrate at a temperature between about 300° and 425° C. in a non-oxygenous atmosphere in the presence of an applied magnetic field, the improvement which comprises exposing the thus-formed freshly-deposited film to an oxygen-containing atmosphere for a period while continuing to maintain the temperature at about 300° C. or higher, the oxygen-containing atmosphere having sufficient oxygen to impart non-destructive-read-out properties to said film in the exposure period at the exposure temperature.

5. A thin magnetic film having NDRO characteristics and produced by the method of claim 4.

6. A thin film according to claim 5 comprised of from 77 to 83% nickel, from 0 to 3% cobalt and the balance iron and oxidized throughout its grain boundaries as well as along its surface.

7. A method according to claim 4 wherein the thin magnetic film is a permalloy film having a thickness of at most 1000 A.

8. A method according to claim 4 wherein the oxygen-containing atmosphere is introduced substantially immediately after the deposition of the film and the oxygen therein is sufficient to oxidize said film throughout its grain boundaries as well as along its surface.

References Cited

UNITED STATES PATENTS

| | | | |
|---|---|---|---|
| 3,102,048 | 8/1963 | Gran et al. | 117—71 X |
| 3,148,079 | 9/1964 | Banks et al. | 117—237 |
| 3,374,113 | 3/1968 | Chang et al. | 148—103 X |
| 3,375,091 | 3/1968 | Feldtkeller | 29—103 X |

OTHER REFERENCES

H. Zeller, IBM Technical Disclosure Bulletin, December 1966, vol. 9, No. 7, page 895.

WILLIAM D. MARTIN, Primary Examiner

B. D. PIANALTO, Assistant Examiner

U.S. Cl. X.R.

117—237, 238, 239, 240

PO-1050
(5/69)

UNITED STATES PATENT OFFICE
CERTIFICATE OF CORRECTION

Patent No. 3,492,158          Dated January 27, 1970

Inventor(s) Kenneth B. Scow, Joseph P. Anderson, Bruce I. Bertel

It is certified that error appears in the above-identified patent and that said Letters Patent are hereby corrected as shown below:

Column 1, in the Abstract of the Disclosure, line 17, change "254°C." to --425°C.--;
Column 2, line 34, "law" should be --low--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents